Figures 1, 2:
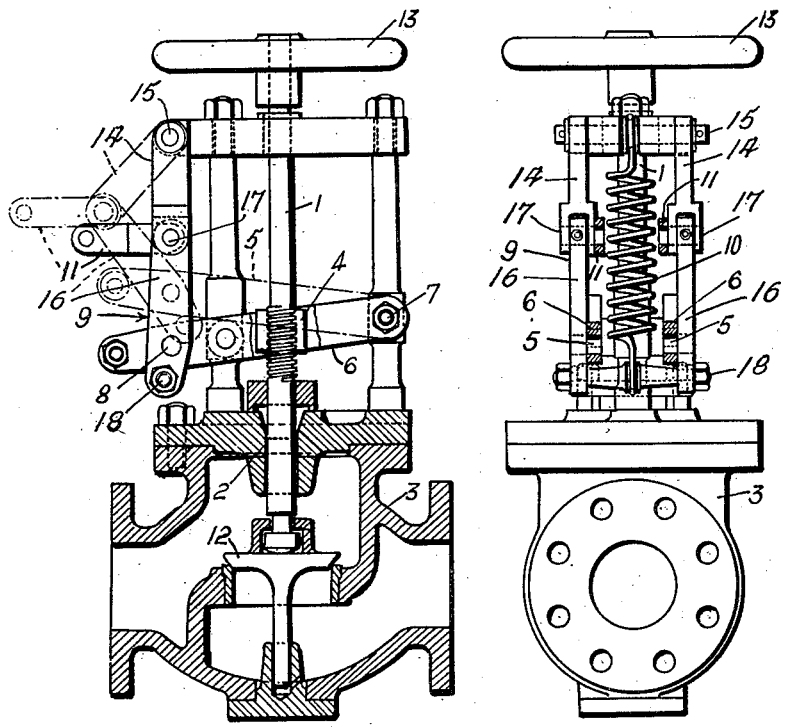

Dec. 12, 1950  W. NELSON  2,533,392
OPERATING MECHANISM FOR MOVING
A ROD OR OTHER MEMBER AXIALLY
Filed March 31, 1948

Inventor:
William Nelson
by
Pennie, Edmonds, Morton and Barrows
Attorneys

Patented Dec. 12, 1950

2,533,392

UNITED STATES PATENT OFFICE 2,533,392

OPERATING MECHANISM FOR MOVING A ROD OR OTHER MEMBER AXIALLY

William Nelson, Glasgow, Scotland, assignor to James Howden & Company Limited, Glasgow, Scotland, a company of Great Britain Application March 31, 1948, Serial No. 18,169
In Great Britain April 9, 1947

2 Claims. (Cl. 74—100)

This invention relates to an operating mechanism useful in connection with fluid control valves of the type in which the valve is opened or closed by rotation of a rod screw-threaded over part of its length and coupled to the movable member of the valve proper.

An object of the invention is to provide an operating mechanism adapted to function quickly in an emergency, for example, in the opening of a valve.

In a mechanism according to the invention the rod passes through a hole in the valve body and an internally screw-threaded sleeve is provided for engagement by the rod, said sleeve being provided with trunnions engageable in slots in a lever pivotally attached at one end of the valve body, the other end of the lever being pivotally attached to one end of a toggle, the other end of which is pivotally attached to the valve body, a spring being so connected to the toggle that the ends of the toggle are normally urged towards one another, an operating link or a lanyard being connected to the joint of the toggle links.

For ease of manufacture, and balance, the lever and the toggle may be formed as a double lever and a double toggle, respectively.

A practical embodiment of the invention is illustrated in the accompanying drawings in which Fig. 1 is a longitudinal vertical section of a valve, and Fig. 2 is an end elevation of a valve.

In the drawings, in which the mechanism is illustrated in connection with a valve, 1 denotes the rod passing through the hole 2 in the valve body 3. 4 denotes the internally screw-threaded sleeve formed with trunnions 5 engaging slots in the lever 6, which is pivoted at 7 to the valve body 3, and is pivoted at 8 to the toggle 9. 10 denotes the spring adapted to urge the ends of the toggle 9 towards one another, and 11 denotes an operating link. 12 denotes the movable member of the valve proper, and 13 denotes a handle for rotating the rod 1. The toggle, as shown in the drawings, comprises a pair of spaced upper links 14 carried on a fixed pivot pin 15 and a pair of spaced lower links 16 having their upper ends pivoted to the lower ends of links 14, respectively, at 17. The spring 10 is connected under tension to the pin 15 and to a bolt 18 connecting the lower ends of the links 16.

In practice, to close the valve, the centre of the toggle 9 is moved to straighten the toggle against the action of the spring 10. When the toggle is made, the spring 10 is held in the position of maximum stress and the lever 6 carrying the sleeve 4 is swung to a position close to the movable member 12. The rod 2 is rotated and advances through the sleeve 4 to close the valve. (The full lines in Fig. 1 indicate the valve-closed position.) To open the valve, the operating link 11 is pulled, thereby breaking the toggle. The spring 10 immediately forces the end of the toggle 9 attached to the lever 6 to move towards the other end of the toggle which is attached to the valve body 3, thereby causing the lever 6 to move around its pivot 7 away from the movable member 12 and carry with it the sleeve 4, which in turn carries with it the rod 2, thereby opening the valve. The dotted lines in Fig. 1 indicate the positions of the lever 6, the toggle 9, and the link 11 in valve-open position.

What is claimed is:

1. The combination with a rectilinearly movable member formed with trunnions, of a lever mounted on a fixed pivot and formed with slots engaged by said trunnions, at least one pair of toggle links pivotally jointed to one another at their adjacent ends, one of said links being mounted on a fixed pivot at the end remote from the joint, and the other link being pivoted to said lever at the end remote from the joint, an operating link connected to the joint of said toggle links, and a spring connected at one end to the end of said other link pivoted to said lever and fixed at its opposite end and urging said lever in the direction to cause the remote ends of said toggle links to approach one another.

2. An operating mechanism for moving a rod axially, comprising trunnions attached to the rod, a lever extending generally transversely to the rod and having slots intermediate its ends in which said trunnions are engaged, one end of said lever having a fixed pivot, a toggle including a pair of links pivoted together end-to-end, the other end of one of the links being pivotally connected to the other end of said lever, said links when in line extending in a direction generally transverse to the lever, the other end of the other link having a fixed pivot, a spring connected to the end of the toggle to which the lever is connected and urging the opposite ends of the toggle toward each other, and means connected to the pivot joint of the links for operating the toggle.

WILLIAM NELSON.

REFERENCES CITED

The following references are of record in the file of this patent:

UNITED STATES PATENTS

| Number | Name | Date |
| --- | --- | --- |
| 966,672 | Ellison | Aug. 9, 1910 |
| 1,444,576 | Williamson | Feb. 6, 1923 |
| 1,552,833 | Fischback | Sept. 8, 1925 |

FOREIGN PATENTS

| Number | Country | Date |
| --- | --- | --- |
| 191,599 | Great Britain | Jan. 18, 1923 |